United States Patent [19]

Witman et al.

[11] Patent Number: 4,603,170

[45] Date of Patent: Jul. 29, 1986

[54] MOULDING COMPOSITIONS COMPRISING AN AROMATIC POLYCARBONATE AND A SULFONE GROUP CONTAINING POLYESTER

[75] Inventors: Mark W. Witman, Pittsburgh, Pa.; Wolfgang Stix, Neckarsteinach, Fed. Rep. of Germany; Karl-Heinz Köhler, Krefeld, Fed. Rep. of Germany; Leo Morbitzer, Cologne, Fed. Rep. of Germany

[73] Assignee: Bayer Aktiengesellschaft, Leverkusen, Fed. Rep. of Germany

[21] Appl. No.: 768,628

[22] Filed: Aug. 23, 1985

[30] Foreign Application Priority Data

Sep. 4, 1984 [DE] Fed. Rep. of Germany ....... 3432412

[51] Int. Cl.[4] ............................................ C08L 69/00
[52] U.S. Cl. .................................... 525/67; 525/439; 525/148; 525/466

[58] Field of Search ................ 525/439, 535, 906, 67, 525/148, 466; 528/294

[56] References Cited

U.S. PATENT DOCUMENTS 4,110,315  8/1978  Go ........................................ 528/294
4,510,289  4/1985  Fox et al. ............................. 525/148

*Primary Examiner*—Theodore E. Pertilla
*Attorney, Agent, or Firm*—Connolly and Hutz

[57] ABSTRACT

Thermoplastic moulding compounds obtained from: from 98 to 10 parts, by weight, of aromatic polycarbonates having an average molecular weight $M_w$ (by light scattering) of from 10,000 to 200,000; from 60 to 0 parts, by weight, of polyalkylene terephthalate; from 30 to 0 parts, by weight, of graft polymer of one or more ethylenically unsaturated monomers on a rubber; and from 90 to 2 parts, by weight, of a polyester of terephthalic acid and a diol containing at least one diaryl sulphone group in the molecule and, optionally, an aliphatic diol in addition.

5 Claims, No Drawings

MOULDING COMPOSITIONS COMPRISING AN AROMATIC POLYCARBONATE AND A SULFONE GROUP CONTAINING POLYESTER

This invention relates to thermoplastic moulding compositions which comprise:
(A) from 98 to 10 parts, by weight, of aromatic polycarbonates having an average molecular weight $M_w$ (by light scattering) of from 10,000 to 200,000;
(B) from 60 to 0 parts, by weight, of polyalkylene terephthalate;
(C) from 30 to 0 parts, by weight, of graft polymer of one or more ethylenically unsaturated monomers on a rubber; and
(D) from 90 to 2 parts, by weight, of a polyester of terephthalic acid and a diol containing at least one diaryl sulphone group in the molecule and, optionally, an aliphatic diol.

Diols containing diaryl sulphone groups may correspond, for example, to the following general formula (I):

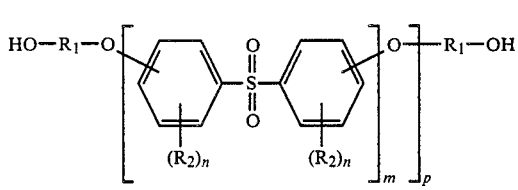

wherein
$R_1$ represents $$CH_2-CH_2 \text{ or } CH_2-\overset{CH_3}{\underset{|}{CH}}$$

or a polyalkyl ether group $—(CH_2—CH_2—O—)_x$ or $—(CH_2—CH_2—CH_2—O)_x$ or $—(CH_2—CH_2—CH_2—CH_2—O—)_x$ with $x=2$ to 10

$R_2$ represents an alkyl group having from 1 to 4 carbon atoms or a halogen atom;
n represents 0, 1, 2, 3 or 4 and
m and p each represents an integer having a value of at least 1.

The following are examples of diols corresponding to general formula (I):

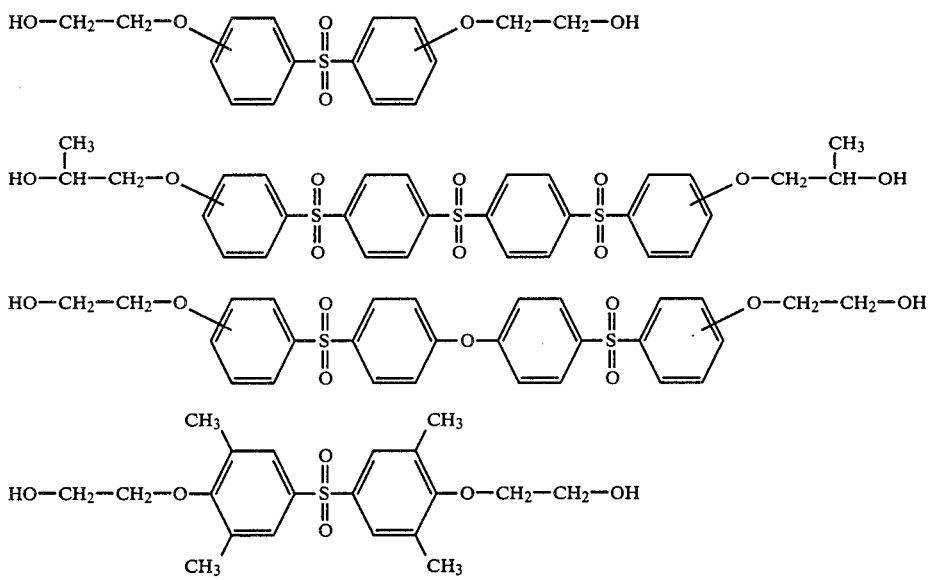

The following are further examples of diols containing diaryl sulphone groups:

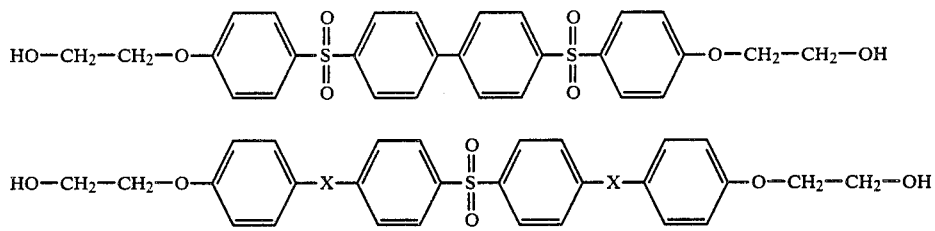

wherein
x represents

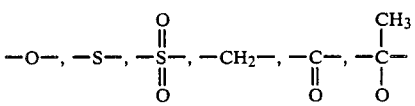

single bond; and polyether sulphones and polysulphones containing aliphatic hydroxyl end groups.

Diols corresponding to the following general formula are preferred:

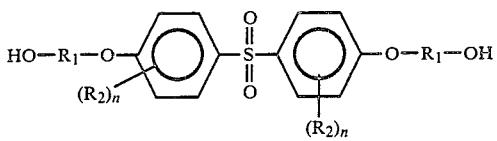

wherein $R_1$ represents

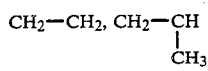

or a polyalkyl ether group; $-(CH_2-CH_2-O-)_x$, $-(CH_2-CH_2-CH_2-O-)_x$ or $-(CH_2-CH_2-CH_2-CH_2-CH_2-O-)_x$ with $x = 2$ to $10$ $R_2$ represents a $C_1-C_4$ alkyl group or a halogen atom, n represents 0, 1 or 2.

By "aromatic polycarbonates (A)" are meant, in the present context, the known homopolycarbonates, copolycarbonates and mixtures of these poycarbonates based, for example, on at least one of the following diphenols:
hydroquinone,
resorcinol,
dihydroxybiphenyls,
bis-(hydroxyphenyl)-$C_1-C_8$-alkanes,
bis-(hydroxyphenyl)-$C_4-C_5$-cycloalkanes,
bis-(hydroxyphenyl)-sulphides,
bis-(hydroxyphenyl)-ethers,
bis-(hydroxyphenyl)-ketones,
bis-(hydroxyphenyl)-sulphides,
bis-(hydroxyphenyl)-sulphones and
$\alpha,\alpha'$-bis-(hydroxyphenyl)-diisopropyl benzenes.

These and other suitable diphenols have been described, for example, in U.S. Pat. Nos. 3,028,365; 3,275,601; 3,148,172; 3,062,781; 2,991,273 and 2,999,846.

The following are examples of preferred diphenols
4,4'-dihydroxy-biphenyl,
2,4-bis-(4-hydroxyphenyl)-2-methyl butane,
$\alpha,\alpha'$-bis-(4-hydroxyphenyl)-p-diisopropyl benzene,
bis-(4-hydroxyphenyl)ether,
bis-(4-hydroxyphenyl)sulphone and
bis-(4-hydroxyphenyl)ketone.

The following are examples of particularly preferred diphenols:
2,2-bis-(4-hydroxy-phenyl)-propane,
bis-(hydroxyphenyl)-methane and
1,1-bis-(4-hydroxyphenyl)-cyclohexane.

The aromatic polycarbonates (A) may be branched by the incorporation of small quantities, preferably from 0.05 to 2.0 mol %, (based on the quantity of diphenols), of tri-functional or higher than tri-functional compounds, for example compounds having 3 or more than 3 phenolic hydroxyl groups.

The aromatic polycarbonates (A) generally have average molecular weights $M_w$ of from 10,000 to 200,000, preferably from 20,000 to 80,000, determined by light scattering.

The high molecular weight polycarbonates having $M_w$ from 10,000 to 200,000 may be mixed with small proportions of low molecular weight polycarbonates, e.g. having an average degree of polycondensation of from 2 to 20.

The molecular weight $M_w$ of the polycarbonates (A) can be adjusted in known manner by the addition of calculated quantities of chain-breaking agents, such as phenol, halogenated phenols or alkyl phenols.

The polycarbonates (A) to be used according to the present invention are obtainable in known manner, either by the phase interface process or by a process carried out in homogeneous solution (pyridine process) or optionally by the melt transesterification process.

Polyalkylene terephthalates (B) may be prepared by known methods from terephthalic acid (or reactive derivatives thereof, e.g. dimethyl terephthalate) and aliphatic or cycloaliphatic diols having from 2 to 10 carbon atoms (Kunststoff Handbuch, Volume VIII, page 695 et seq, Carl Hanser Verlag, Munich 1973).

Preferred polyalkylene terephthalates (B) contain at least 80 mol %, preferably not less than 90 mol %, based on the dicarboxylic acid component, of terephthalic acid groups, and at least 80 mol %, preferably not less than 90 mol %, based on the diol component, of ethylene glycol and/or butane-1,4-diol groups.

In addition to containing terephthalic acid groups, the preferred polyalkylene terephthalates (B) may contain up to 20 mol % of groups of other aromatic or cycloaliphatic dicarboxylic acids having from 8 to 14 carbon atoms or aliphatic dicarboxylic acids having from 4 to 12 carbon atoms, such as groups of phthalic acid, isophthalic acid, naphthalene-2,6-dicarboxylic acid, 4,4'-diphenyldicarboxylic acid, succinic acid, adipic acid, sebacic acid, azelaic acid or cyclohexane diacetic acid.

In addition to containing ethane°diol or butane-1,4-diol groups, the preferred polyalkylene terephthalates (B) may contain up to 20 mol % of groups of other aliphatic doils having from 3 to 12 carbon atoms or cycloaliphatic diols having from 6 to 21 carbon atoms, e.g. groups of propane-1,3-diol, 2-ethyl propane-1,3-diol, neopentyl glycol, pentane-1,5-diol, cyclohexane-1,6-diol, cyclohexane-1,4-dimethanol, 3-methyl pentane-2,4-diol, 2-methyl pentane-2,4-diol, 2,2,4-trimethyl pentane-1,3- and -1,6-diol, 2-ethyl hexane-1,3-diol, 2,2-diethyl propane-1,3-diol, hexane-2,5-diol, 1,4-di-($\beta$-hydroxy-ethoxy)-benzene, 2,2-bis-(4-hydroxy cyclohexane)-propane, 2,4-dihydroxy1,1,3,3-tetramethyl-cyclobutane, 2,2-bis-(3-$\beta$-hydroxyethoxyphenyl)-propane and 2,2-bis-(4-hydroxypropoxy-phenyl)propane (DE-OS Nos. 2,407,674; 2,407,776; 2,715,932).

The polyalkylene terephthalates (B) may branched by the incorporation of relatively small quantities of trihydric or tetrahydric alcohols or tribasic or tetrabasic carboxylic acids, such as those described, for example, in DE-OS No. 1,900,270 and in U.S. Pat. No. 3,692,744. Trimesic acid, trimellitic acid, trimethylol-ethane and -propane and pentaerythritol are examples of preferred branching agents.

Graft polymers (C) for the purposes of the present invention have either a monomer selected from styrene and methyl methacrylate or a monomer mixture of from 95 to 50%, by weight, of styrene, $\alpha$-methyl styrene, nuclear substituted styrene, methyl methacrylate or mixtures thereof and from 5 to 50%, by weight, of (meth)acrylonitrile, maleic acid anhydride, N-substituted maleimides or mixtures thereof graft polymerised on a rubber. Suitable rubbers are, in particular, polybutadiene, butadiene/styrene copolymers with up to 30%, by weight, of styrene incorporated by polymerisation, copolymers of butadiene and acrylonitrile containing up to 20% by weight, of acrylonitrile or copolymers of butadiene containing up to 20% by weight, of a lower alkyl ester preferably $C_1-C_6$ alkyl ester of acrylic or methacrylic acid (e.g. methyl acrylate, ethyl acrylate, methyl methacrylate or ethyl methacrylate).

Polyisoprene and polychloroprene are further examples of suitable rubbers. Alkyl acrylate rubbers based on $C_1$–$C_8$ alkyl acrylates, in particular on ethyl, butyl or ethyl hexyl acrylate, are also suitable. These alkyl acrylate rubbers may contain up to 30%, by weight, of monomers, such as vinyl acetate, acrylonitrile, styrene, methylmethacrylate or vinyl ethers, incorporated by copolymerisation. In addition, these alkyl acrylate rubbers may contain small quantities (up to 50%, by weight) of ethylenically unsaturated monomers which have a cross-linking action. Examples include alkylene diol di-(meth)acrylates, polyester di-(meth)acrylates, di- and tri- vinyl benzene, triallyl cyanurate, allyl (meth)acrylate, butadiene or isoprene. Alkyl acrylates of this type are known. The acrylate rubbers used as graft base may also be products containing, as nucleus, a cross-linked diene rubber of one or more conjugated dienes, such as polybutadiene or a copolymer of a conjugated diene with a ethylenically unsaturated monomer, such as styrene and/or acrylonitrile. EPDM rubbers, i.e. rubbers of ethylene, propylene and a non-conjugated diene monomer, are further examples of suitable rubbers.

Diene rubbers and alkyl acrylate rubbers are preferred.

The graft copolymers contain from 10 to 95%, by weight, in particular from 20 to 70%, by weight, of rubber and from 90 to 5%, by weight, in particular from 80 to 30%, by weight, of graft copolymerised monomers. The rubbers are present in these graft copolymers in the form of at least partially cross-linked particles having an average particle size of from 0.09 to 5 μm, in particular from 0.1 to 1 μm. Such graft copolymers can be prepared by radical graft copolymerisation of monomers selected from styrene, α-methyl styrene, nuclear substituted styrene, (meth)acrylonitrile, methyl methacrylate, maleic acid anhydride and N-substituted maleimide, in the presence of the rubbers which are to be grafted. Such graft copolymers are known. Emulsion, solution, solvent-free and suspension polymerisation are preferred methods of preparation for such graft copolymers.

The polyesters (D) are built up of diaryl sulphone group-containing diols to an extent of from 3 to 40%, by weight, based on the polyester (D). They may be prepared by the same methods as those mentioned for component (B), only the diol or part of the diol component must be replaced by a diol containing diaryl sulphone groups. Diols corresponding to general formula (I), for example, may be used. Polyether sulphones and polysulphones containing aliphatic hydroxyl end groups are suitable diols. The aryl groups in the diols may be substituted with halogen or alkyl groups. 4,4'-bis-(2-hydroxyethoxy)-diphenyl sulphone is preferably used.

Mixtures of aromatic polycarbonates and polyesters are known (DE-AS No. 1,694,124 or DE-OS No. 2,622,414).

Rubbery elastic graft copolymers having a glass transition temperature below −20° C. may be introduced into the polycarbonate/polyester mixtures to increase the toughness thereof. Mixtures of this type are also known (U.S. Pat. No. 3,864,428).

The rubber modified form of polycarbonate/polyester mixtures is of particular economic importance for the production of external parts of motor vehicles which are required to be tough and resistant to engine fuel.

Inspite of the many positive properties thereof, these moulding compounds fail to meet certain requirements. One serious disadvantage of these compounds is the low dimensional stability under heat. Thus, under prolonged exposure to elevated temperatures, such as may occur when component parts are first lacquered or the assembled structure is subsequently lacquered (e.g. motor vehicles), unacceptable distortions are liable to occur which render these moulding compounds unusable for many purposes.

There is therefore a demand for moulding compounds having a dimensional stability under heat of at least 120° C. in addition to the well known advantageous physical and chemical properties of polycarbonate/polyester mixtures.

The mixtures according to the present invention of polycarbonate, optionally rubber modifier, and a polyester component composed at least partially of a diol containing diaryl sulphone groups have a distinctly improved dimensional stability under heat and are very tough at low temperatures.

The increase in dimensional stability under heat in the mixtures containing the polyesters used according to the present invention is surprising since both the melting point of the crystalline components and the degree of crystallisation of these polyesters are lower than in conventional polyalkylene terephthalates, so that a lower dimensional stability under heat would have been expected. Thus, for example, a polybutylene terephthalate having an intrinsic viscosity of 1.7 is found to have a melting point of 223° C. (maximum of melting peak in DTA) and a heat of fusion of 48 J/g, while a polybutylene terephthalate containing 10%, by weight, of 4,4'-bis-(2-hydroxyethoxy)diphenyl sulphone incorporated by condensation and having an intrinsic viscosity of 1.8 was found to have a melting point of 209° C. and a heat of fusion of 33 J/g.

The moulding compounds produced with the PBTP to be used according to the present invention undergo no distortion even at temperature up to 130° C. and are very tough. Moulded parts produced from these compounds may therefore readily be lacquered with suitable lacquer systems and used on the exterior of motor vehicles as parts which are resistant to petrol and have high impact strength even at low temperatures.

The moulding compounds according to the present invention may be prepared in the conventional mixing apparatus, such as roller, kneaders or single-shaft or multi-shaft extruders.

The moulding compounds according to the present invention may contain the conventional additives for polycarbonates and/or polyesters, such as lubricants and mould release agents, nucleating agents, stabilisers, fillers and reinforcing materials, flame retarding agents and/or dyes.

Moulding compounds which have been filled or reinforced may contain up to 30%, by weight, of fillers and/or reinforcing materials, based on the quantity of reinforced moulding compounds. Glass fibres are preferred reinforcing materials. Glass beads, mica, silicates, quartz, talcum, titanium dioxide and wollastonite are preferred fillers which may also have a reinforcing action.

When flame retarding agents are used, these are generally included in the polyester moulding compounds in an amount of less than 30%, by weight, based on the flame retarded moulding compounds.

The flame retarding agents commonly used for polycarbonates or polyesters or rubbery elastic polymers may be used, e.g. polyhalogen diphenyl, polyhalogen diphenyl ether, polyhalogen phthalic acid and derivatives thereof, and polyhalogen oligo- and poly-carbonates, the bromine compounds being particularly effective. The flame retarding agents in addition generally contain a synergistic agent, e.g. antimony trioxide.

The moulding compounds according to the present invention obtained from polycarbonates, modified polyalkylene terephthalates and optionally rubbery elastic polymers and optionally the above-mentioned further additives may be used to form moulded products, such as car bumpers, shock absorbing bars or hub caps, and may thus be used, for example, on the outside of motor vehicles.

EXAMPLES

Components used.

I. Polycarbonate prepared in known manner from bisphenol A, phenol and phosgene, relative viscosity 1.285, determined in dichloromethane at 25° C. using a 0.5 g/100 ml solution.

II. Polybutylene terephthalate prepared in known manner from dimethyl terephthalate and butane-1,4-diol and having a intrinsic viscosity of 1.18 dl/g, determined in phenol/o-dichlorobenzene (proportions, by weight, 1:1) at 25° C. in an Ubbelohde viscosimeter.

III. Graft polymer, 80% by weight graft base of crosslinked polybutadiene (gel content above 70%, determined in toluene) and 20% by weight graft base of polymethyl methacrylate prepared in known manner.

IV. Copolybutylene terephthalate containing 10% by weight, of 4,4'-bis-hydroxyethoxy diphenyl sulphone and prepared as follows:

The following components are introduced under an inert nitrogen atmosphere at room temperature into an oil-heated, 25 liter steel autoclave equipped with stirrer, vacuum distillation attachment and bottom discharge device:

4.66 kg (24 mol) of dimethyl terephthalate, 0.529 kg (1.56 mol) of 4,4'-bis-hydroxyethoxydiphenyl sulphone (10%, by weight, based on co-PBT), 2.89 kg (32 mol) of butane diol, and 2.73 kg of titanium tetraisopropylate.

The reaction mixture is heated to 190° C. under a nitrogen atmosphere within 2 hours and then stirred for a further 2 hours at 190° C. and 1 hour at 200° C. until the methanol has been eliminated almost quantitatively. When ester interchange has been completed, the pressure in the oligocondensation stage is reduced to about 1 Torr within 1-2 hours and the reaction temperature is raised from 200° C. to 260° C. so that butane diol is distilled off.

As the pressure is further reduced to about 0.3 Torr, the medium viscosity precondensate is polycondensed within about 1 hour at 260° C. with elimination of butane diol.

The polyester melt is spun in water in the conventional manner and granulated. The relative viscosity $\eta$rel of the dry granulate is determined at a condensation of 0.5 g per 100 ml of a solvent mixture of phenol-/o-dichlorobenzene (proportions, by weight, 1:1) in an Ubbelohde viscosimeter at 25° C.

$\eta$rel: 1.521.

The after-condensed product was used in Example 2.

V. Copolybutylene terephthalate containing 20%, by weight, of 4,4'-bis-hydroxyethoxy diphenyl sulphone and prepared as described for component IV. The aftercondensed product had a viscosity of 2.164. It was used in Example 3.

Preparation of the moulding compounds

The components are melted and homogenised in a two-shaft extruder at temperatures of 320° C. under a nitrogen atmosphere. The melt strand is degasified before leaving the nozzle, cooled in water, granulated and dried. The product is worked-up in an injection moulding machine at a mass temperature of 270° C.

Table I contains the results of the experiments.

TABLE 1

| Example No. | Components (%, by weight) | | | | | Vicat[1] °C. | Izod (J/m)[2] | | |
|---|---|---|---|---|---|---|---|---|---|
| | I | II | III | IV | V | | RT | −30° C. | −40° C. |
| 1 | 54 | 36 | 10 | — | — | 120 | 819 | 656 | 326 |
| 2 | 54 | — | 10 | 36 | — | 130 | 856 | 734 | 657 |
| 3 | 54 | — | 10 | — | 36 | 132 | 875 | 777 | 727 |

[1]Vicat softening temperature VST Method B, determined according to ISO 306 (DIN 53 460)
[2]Determined according to ASTM D 256 on test samples 3.2 mm in thickness.

We claim:

1. A thermoplastic moulding composition which comprises:
   (A) from 98 to 10 parts, by weight, of one or more aromatic polycarbonates having an average molecular weight $M_w$ (determined by light scattering) of from 10,000 to 200,000;
   (B) from 60 to 0 parts, by weight, of one or more polyalkylene terephthalates;
   (C) from 30 to 0 parts, by weight, of one or more ethylenically-unsaturated monomers grafted on one or more rubbers; and
   (D) from 90 to 2 parts, by weight, of one or more polyesters of terephthalic acid and one or more diaryl sulphone group-containing diols.

2. A composition as claimed in claim 1 wherein (D) incorporates a diol component of the formula

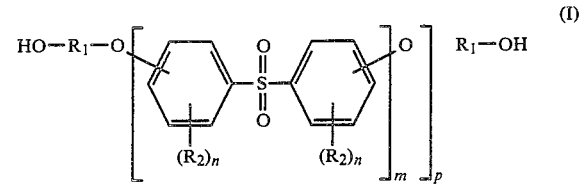

wherein $R_1$ independently represents

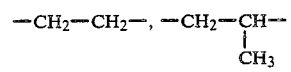

or a polyalkyl ether group; $-(CH_2-CH_2-O-)_x$, $-(CH_2-CH_2-CH_2-O-)_x$ or $-(CH_2-CH_2-CH_2-CH_2-O-)_x$ with $x=2$ to 10, $R_2$ independently represents $C_1-C_4$ alkyl or halogen;

n represents 0, 1, 2, 3 or 4; and m and p each independently represents an integer.

3. A composition as claimed in claim 1 or claim 2 wherein (D) comprises a diol component of the formula:

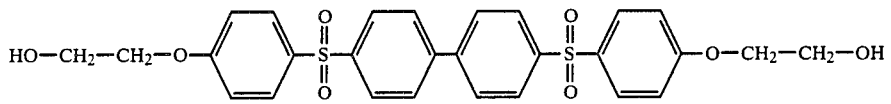

or the formula:

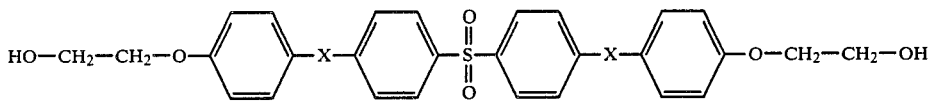

wherein
X represents

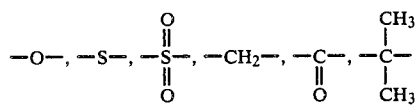

or a single bond;
or which is a polyether sulphone or a polysulphone having aliphatic hydroxyl end groups.

4. A composition as claimed in claim 1 or claim 2 wherein component (D) additionally contains one or more aliphatic diols.

5. A composition as claimed in claim 3 wherein component (D) additionally contains one or more aliphatic diols.

* * * * *